(12) United States Patent
Kajii et al.

(10) Patent No.: US 7,112,547 B2
(45) Date of Patent: Sep. 26, 2006

(54) HIGHLY HEAT-RESISTANT INORGANIC FIBER-BONDED CERAMIC COMPONENT AND PROCESS FOR THE PRODUCTION THEREOF

(75) Inventors: Shinji Kajii, Ube (JP); Kenji Matsunaga, Ube (JP); Toshihiko Hogami, Ube (JP); Mitsuhiko Sato, Ube (JP)

(73) Assignee: UBE Industries, Ltd., Yamaguchi-ken (JP)

( * ) Notice: Subject to any disclaimer, the term of this patent is extended or adjusted under 35 U.S.C. 154(b) by 181 days.

(21) Appl. No.: 10/634,829

(22) Filed: Aug. 6, 2003

(65) Prior Publication Data

US 2004/0029704 A1 Feb. 12, 2004

(30) Foreign Application Priority Data

Aug. 9, 2002 (JP) ............................. 2002-232689
May 28, 2003 (JP) ............................. 2003-150297

(51) Int. Cl.
*C04B 35/80* (2006.01)
*C04B 35/577* (2006.01)

(52) U.S. Cl. .................. 501/95.2; 501/87; 501/88; 428/293.4; 428/293.7; 428/294.1

(58) Field of Classification Search ............ 501/95.2, 501/87, 88; 428/293.4, 293.7, 294.1
See application file for complete search history.

(56) References Cited

U.S. PATENT DOCUMENTS

| | | | | |
|---|---|---|---|---|
| 5,866,244 | A | * | 2/1999 | Jessen .................. 428/293.4 |
| 6,132,856 | A | | 10/2000 | Ishikawa et al. |
| 6,451,416 | B1 | * | 9/2002 | Holowczak et al. ..... 428/293.4 |
| 6,696,144 | B1 | * | 2/2004 | Holowczak et al. ..... 428/293.4 |

FOREIGN PATENT DOCUMENTS

JP 09-0527776 2/1997

OTHER PUBLICATIONS

Translation of Japanese document 09-052776, published Feb. 25, 1997.*

* cited by examiner

*Primary Examiner*—Karl Group
(74) *Attorney, Agent, or Firm*—Wenderoth, Lind & L.L.P.

(57) ABSTRACT

Production processes of an inorganic fiber-bonded ceramic component comprising inorganic fibers mainly comprising Si, M, C and O, an inorganic substance mainly comprising Si and O and boundary layers comprising carbon as a main component; and an inorganic fiber-bonded ceramic component comprising inorganic fibers which are composed mainly of a sintered structure of SiC and contain specific metal atoms and boundary layers composed mainly of carbon, wherein a preliminary shaped material is set in a carbon die, covered with a carbon powder and then hot-pressed to load a pseudo-isotropic pressure on the preliminary shaped material; and a highly heat-resistant inorganic fiber-bonded ceramic component almost free from the occurrence of peelings of surface fibers or delamination, wherein fibers are aligned in a surface shape.

2 Claims, 4 Drawing Sheets

HIGHLY HEAT-RESISTANT INORGANIC FIBER-BONDED CERAMIC COMPONENT AND PROCESS FOR THE PRODUCTION THEREOF

FIELD OF THE INVENTION

The present invention relates to a highly heat-resistant inorganic fiber-bonded ceramic component usable at a part requiring extremely high heat resistance of 1,200° C. or higher, wherein fibers are regularly disposed on the surface of the inorganic fiber-bonded ceramic component and the properties of the surface are homogeneous and to a process for the production thereof. Particularly, it can be applied to a high-temperature component which has high surface smoothness and density and is required to have high fracture resistance such as a high-temperature component of a gas turbine for power generation or for an airplane.

PRIOR ARTS OF THE INVENTION

A fiber-bonded ceramics has remarkably higher toughness than a monolithic ceramics and is a highly reliable material. Further, when compared with a carbon fiber-reinforced carbon-based composite material (to be referred to as "C/C composite material" hereinafter) produced by the chemical vapor deposition method (CVD method), the chemical vapor infiltration method (CVI method), the polymer impregnation and pyrolysis method (PIP method) or the like, the fiber-bonded ceramics is remarkably closely packed and excellent in surface smoothness. Therefore, the fiber-bonded ceramics is a closely-packed high-temperature material having high heat resistance and high toughness.

However, conventionally, a bulk material is machined for producing a complex-shaped component of the fiber-bonded ceramics. For this reason, uneconomically, cutting allowance due to the machining is very large depending upon the shape of the component.

Further, since the fiber-bonded ceramics is produced by pressurizing a laminate material at a high temperature, fiber orientation falls into disorder due to shrinkage of the laminate material caused by the pressurization in some cases. Moreover, in the case of an inorganic fiber-bonded ceramic component produced by machining a bulk material, interlayers of the inorganic fiber-bonded ceramics are exposed on the surface of the component and fiber-reinforced portions and interlayer portions are co-present. In this case, when a large stress is exerted to a surface portion where the fiber orientation is disordered or a surface portion where the interlayers are exposed, it causes the occurrence of cracks (peeling of fibers of the surface portion, delamination). Therefore, it is desired to establish a process for the production of an inorganic fiber-bonded ceramics in which fibers are homogeneously aligned without any exposure of interlayers on the surface of the inorganic fiber-bonded ceramic component.

SUMMARY OF THE INVENTION

It is an object of the present invention to provide a process for primary-molding a highly heat-resistant inorganic fiber-bonded ceramics having excellent heat resistance and smoothness and high fracture resistance in a shape similar to a component shape.

It is another object of the present invention to provide a highly heat-resistant inorganic fiber-bonded ceramic component in which fibers are aligned in a surface shape, which component is almost free from the occurrence of peelings of surface fibers or delamination.

Accordingly, it is possible to decrease cutting allowance due to processing and decrease a production cost. For example, it becomes possible to supply a high-temperature component, such as a gas turbine for power generation or for an airplane, at a relatively low cost.

According to the present invention, there is provided a process for the production of a component of a highly heat-resistant inorganic fiber-bonded ceramics (A) composed of (i) inorganic fibers comprising (a) and/or (b), (a) an amorphous substance comprising Si, M, C and O (M is Ti or Zr), (b) an assembly of (1) crystalline fine particles of β-SiC, MC and C and (2) amorphous substances of $SiO_2$ and $MO_2$, (ii) an inorganic substance comprising (c) and/or (d) and optionally comprising (e) dispersed therein, which substance fills interstices between the above inorganic fibers, (c) an amorphous substance comprising Si and O and optionally comprising M, (d) a crystalline substance comprising crystalline $SiO_2$ and $MO_2$, (e) a crystalline fine particle inorganic substance comprising MC having a particle diameter of 100 nm or less, and (iii) boundary layers with thickness of 1 to 100 nm comprising carbon as a main component and optionally comprising crystalline particles of MC having a particle diameter of 100 nm or less dispersed therein, the boundary layers being formed on the surfaces of the inorganic fibers, which process comprises preparing a laminate material (B) of inorganic fibers comprising an internal layer and a surface layer each, as a raw material, the internal layer being composed of an inorganic substance containing (a) and/or (b), (a) an amorphous substance comprising Si, M, C and O (M is Ti or Zr), (b) an assembly of (1) crystalline ultra fine particles of β-SiC, MC and C and (2) amorphous substances of $SiO_2$ and $MO_2$, the surface layer being composed of an inorganic substance containing (c) and/or (d), (c) an amorphous substance comprising Si and O and optionally comprising M, (d) a crystalline substance comprising crystalline $SiO_2$ and/or $MO_2$, the surface layer having a thickness T (unit: μm) satisfying T=aD (in which a is a number in the range of from 0.023 to 0.053 and D is a diameter (unit: μm) of the inorganic fiber), disposing the laminate material (B) around a carbon core having a predetermined shape to produce a preliminary shaped material, setting the preliminary shaped material in a carbon die, covering the preliminary shaped material with a carbon powder, and then, loading a pseudo-isotropic pressure on the preliminary shaped material by hot-pressing in an inert gas atmosphere at a temperature in the range of from 1,500 to 2,000° C. under a pressure of 10 to 100 MPa.

According to the present invention, there is further provided a process for the production of a component of a highly heat-resistant inorganic fiber-bonded ceramics (A) composed of (i) inorganic fibers comprising (a) and/or (b), (a) an amorphous substance comprising Si, M, C and O (M is Ti or Zr), (b) an assembly of (1) crystalline fine particles of β-SiC, MC and C and (2) amorphous substances of $SiO_2$ and $MO_2$, (ii) an inorganic substance comprising (c) and/or (d) and optionally comprising (e) dispersed therein, which substance fills interstices between the above inorganic fibers, (c) an amorphous substance comprising Si and O and optionally comprising M, (d) a crystalline substance comprising crystalline $SiO_2$ and $MO_2$, (e) a crystalline fine particle inorganic substance comprising MC having a particle diameter of 100 nm or less, and (iii) boundary layers with thickness of 1 to 100 nm comprising carbon as a main component and optionally comprising crystalline particles of MC having a particle diameter of 100 nm or less dispersed therein, the boundary layers being formed on the surfaces of the inorganic fibers, which process comprises preparing a laminate material (B) of inorganic fibers comprising an internal layer and a surface layer each, as a raw material, the internal layer being composed of an inorganic substance containing (a) and/or (b), (a) an amorphous substance comprising Si, M, C and O (M is Ti or Zr), (b) an assembly of (1) crystalline ultra fine particles of β-SiC, MC and C and (2) amorphous substances of $SiO_2$ and $MO_2$, the surface layer being composed of an inorganic substance containing (c) and/or (d), (c) an amorphous substance comprising Si and O and optionally comprising M, (d) a crystalline substance comprising crystalline $SiO_2$ and/or $MO_2$, the surface layer having a thickness T (unit: μm) satisfying T=aD (in which a is a number in the range of from 0.023 to 0.053 and D is a diameter (unit: μm) of the inorganic fiber), disposing the laminate material (B) on a surface of a component which is obtained by processing a bulk material of the inorganic fiber-bonded ceramics to a size smaller than a predetermined component size, to produce a preliminary shaped material, setting the preliminary shaped material in a carbon die, covering the preliminary shaped material with a carbon powder, and then, loading a pseudo-isotropic pressure on the preliminary shaped material by hot-pressing in an inert gas atmosphere at a temperature in the range of from 1,500 to 2,000° C. under a pressure of 10 to 100 MPa.

According to the present invention, there is further provided a process for the production of a component of a highly heat-resistant inorganic fiber-bonded ceramics (C) comprising inorganic fibers which are composed mainly of a sintered structure of SiC, contain 0.01 to 1% by weight of oxygen and at least one kind of metal atoms selected from the class consisting of metal atoms of the 2A, 3A and 3B groups of the periodic table and are bonded extremely nearly in the closest packing state and boundary layers with thickness of 1 to 100 nm composed mainly of carbon which are present between the fibers, which comprises preparing a laminate material (D) of infusible fibers or inorganic fibers, the infusible fibers being obtained by (a) a first step of adding a compound containing at least one kind of metal atoms selected from the class consisting of the 2A, 3A and 3B groups of the periodic table to a polysilane in which the molar ratio of carbon atoms to silicon atoms is at least 1.5 or a heat reaction product thereof and allowing the resultant mixture to react under heat in an inert gas atmosphere, to prepare a metal-element-containing organosilicon polymer, (b) a second step of melt-spinning the metal-element-containing organosilicon polymer to obtain spun fibers, and (c) a third step of curing the spun fibers at 50 to 170° C. in an oxygen-containing atmosphere to prepare the infusible fibers, the inorganic fibers being obtained by (d) a forth step of converting the above infusible fibers to inorganic fibers in an inert gas atmosphere, disposing the laminate material (D) around a carbon core having a predetermined shape, to prepare a preliminary shaped material, setting the preliminary shaped material in a carbon die, covering the preliminary shaped material with a carbon powder, and then, loading a pseudo-isotropic pressure on the preliminary shaped material by hot-pressing in vacuum or in an atmosphere containing at least one component selected from the group consisting of an inert gas, a reducing gas and hydrocarbon at a temperature in the range of from 1,700 to 2,200° C. under a pressure of 10 to 100 MPa.

According to the present invention, there is further provided a process for the production of a component of a highly heat-resistant inorganic fiber-bonded ceramics (C) comprising inorganic fibers which are composed mainly of a sintered structure of SiC, contain 0.01 to 1% by weight of oxygen and at least one kind of metal atoms selected from the class consisting of metal atoms of the 2A, 3A and 3B groups of the periodic table and are bonded extremely nearly in the closest packing state and boundary layers with thickness of 1 to 100 nm composed mainly of carbon which are present between the fibers, which comprises preparing a laminate material (D) of infusible fibers or inorganic fibers, the infusible fibers being obtained by (a) a first step of adding a compound containing at least one kind of metal atoms selected from the class consisting of the 2A, 3A and 3B groups of the periodic table to a polysilane in which the molar ratio of carbon atoms to silicon atoms is at least 1.5 or a heat reaction product thereof and allowing the resultant mixture to react under heat in an inert gas atmosphere, to prepare a metal-element-containing organosilicon polymer, (b) a second step of melt-spinning the metal-element-containing organosilicon polymer to obtain spun fibers, and (c) a third step of heating the spun fibers at 50 to 170° C. in an oxygen-containing atmosphere to prepare the infusible fibers, the inorganic fibers being obtained by (d) a forth step of converting the above infusible fibers to inorganic fibers in an inert gas, disposing the laminate material (D) on a surface of a component which is obtained by processing a bulk material of the inorganic fiber-bonded ceramics to a size smaller than a predetermined component size, to produce a preliminary shaped material, setting the preliminary shaped material in a carbon die, covering the preliminary shaped material with a carbon powder, and then, loading a pseudo-isotropic pressure on the preliminary shaped material by hot-pressing in vacuum or in an atmosphere containing at least one component selected from the group consisting of an inert gas, a reducing gas and hydrocarbon at a temperature in the range of from 1,700 to 2,200° C. under a pressure of 10 to 100 MPa.

According to the present invention, there is further provided a component of an inorganic fiber-bonded ceramics (A) composed of (i) inorganic fibers comprising (a) and/or (b), (a) an amorphous substance comprising Si, M, C and O (M is Ti or Zr), (b) an assembly of (1) crystalline fine particles of β-SiC, MC and C and (2) amorphous substances of $SiO_2$ and $MO_2$, (ii) an inorganic substance comprising (c) and/or (d) and optionally comprising (e) dispersed therein, which substance fills interstices between the above inorganic fibers, (c) an amorphous substance comprising Si and O and optionally comprising M, (d) a crystalline substance comprising crystalline $SiO_2$ and $MO_2$, (e) a crystalline fine particle inorganic substance comprising MC having a particle diameter of 100 nm or less, and (iii) boundary layers with thickness of 1 to 100 nm comprising carbon as a main component and optionally comprising crystalline particles of MC having a particle diameter of 100 nm or less dispersed therein, the boundary layers being formed on the surfaces of the inorganic fibers, wherein the component has a curved surface and/or an inclined surface and the fibers are aligned in a surface shape of the curved surface and/or the inclined surface.

According to the present invention, there is further provided a component of an inorganic fiber-bonded ceramics (C) comprising inorganic fibers which are composed mainly of a sintered structure of SiC, contain 0.01 to 1% by weight of oxygen and at least one kind of metal atoms selected from the class consisting of metal atoms of the 2A, 3A and 3B groups of the periodic table and are bonded extremely nearly in the closest packing state and boundary layers with thickness of 1 to 100 nm composed mainly of carbon which are present between the fibers, wherein the component has a curved surface and/or an inclined surface and the fibers are aligned in a surface shape of the curved surface and/or the inclined surface.

DETAILED DESCRIPTION OF THE INVENTION

Figure 1:
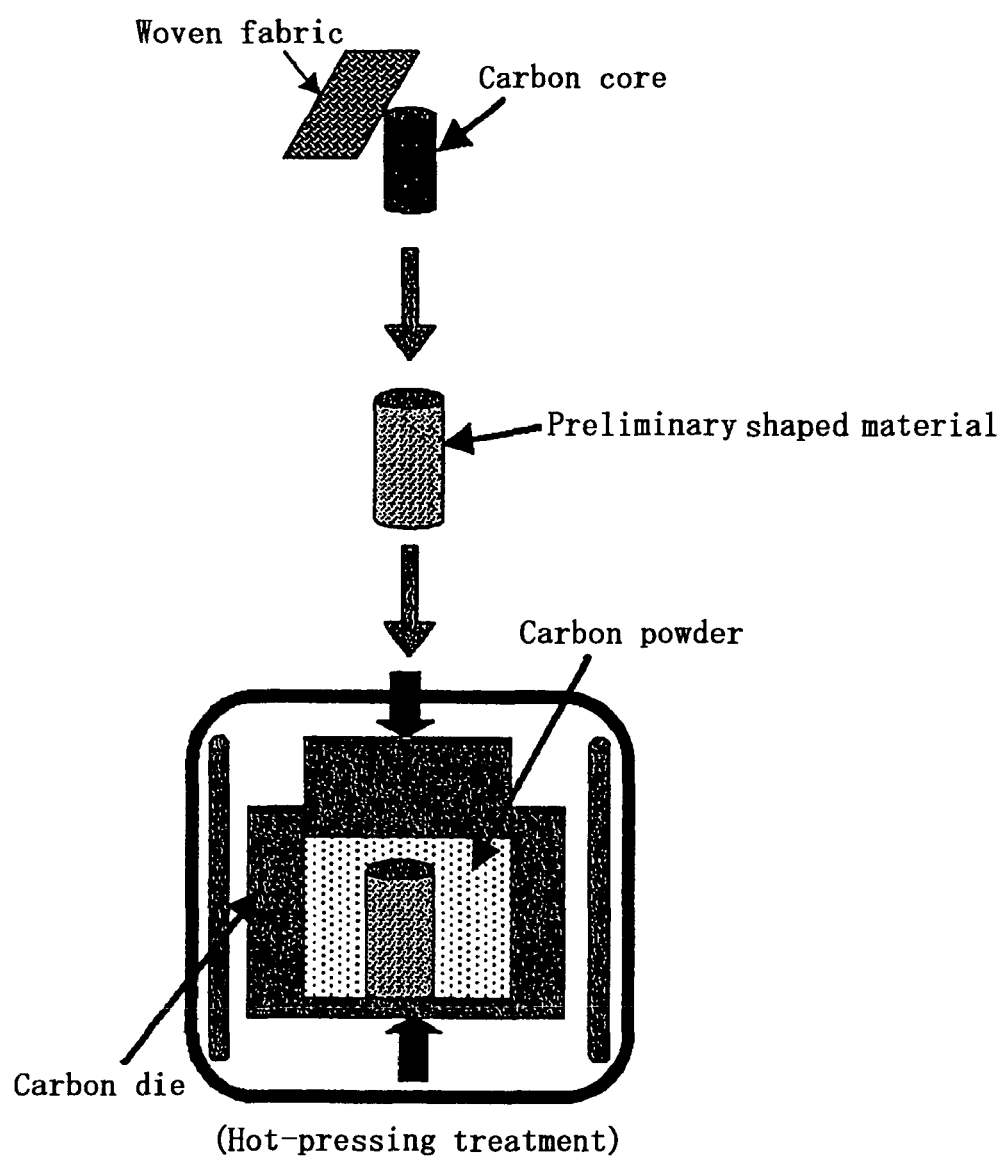
FIG. 1 is a schematic drawing of steps of producing an inorganic fiber-bonded ceramics according to the present invention.

The present invention proposes two kinds of inorganic fiber-bonded ceramic component and production processes of these.

First, the production processes of the inorganic fiber-bonded ceramic component of claim 1 and claim 2 will be explained.

The inorganic fiber-bonded ceramics (A) is composed of (i) inorganic fibers comprising (a) and/or (b), (a) an amorphous substance comprising Si, M, C and O (M is Ti or Zr), (b) an assembly of (1) crystalline fine particles of β-SiC, MC and C and (2) amorphous substances of $SiO_2$ and $MO_2$, (ii) an inorganic substance comprising (c) and/or (d) and optionally comprising (e) dispersed therein, which substance fills interstices between the above inorganic fibers, (c) an amorphous substance comprising Si and O and optionally comprising M, (d) a crystalline substance comprising crystalline $SiO_2$ and $MO_2$, (e) a crystalline fine particle inorganic substance comprising MC having a particle diameter of 100 nm or less, and (iii) boundary layers with thickness of 1 to 100 nm comprising carbon as a main component and optionally comprising crystalline particles of MC having a particle diameter of 100 nm or less dispersed therein, the boundary layers being formed on the surfaces of the inorganic fibers.

The inorganic fibers (i) are composed of (a) an amorphous substance comprising Si, M, C and O and/or (b) an agglomerate of (1) crystalline fine particles of β-SiC, MC and C and (2) amorphous substances of $SiO_2$ and $MO_2$. β-SiC and MC in the crystalline fine particles may be present in the form of solid solutions of these. Further, MC may be present in the form of MC1-x (x is a number of from 0 to less than 1) which is a carbon loss state. Regarding the ratio of each of the elements constituting the inorganic fibers, generally, the inorganic fibers comprises 30 to 60% by weight of Si, 0.5 to 35% by weight, preferably 1 to 10% by weight, of M, 25 to 40% by weight of C and 0.01 to 30% by weight of O. The inorganic fibers generally have an equivalent diameter of 5 to 20 μm.

The inorganic fibers (i) constituting the inorganic fiber-bonded ceramics (A) are present in an amount of at least 80% by volume, preferably 85 to 91% by volume. Amorphous and crystalline carbons are irregularly generated in the form of a layer having a range of 1 to 100 nm, preferably a thickness of 10 to 50 nm as a boundary layer, on the surface of each of the inorganic fibers. Further, in some cases, crystalline particles of MC having a particle diameter of 100 nm or less are dispersed in the boundary layer. Furthermore, (c) an amorphous substance comprising Si and O and optionally comprising M and/or (d) a crystalline substance comprising crystalline $SiO_2$ and $MO_2$ are densely present so as to fill interstices between the inorganic fibers. Further, in some cases, (e) a crystalline fine particle inorganic substance comprising MC having a particle diameter of 100 nm or less is dispersed in the inorganic substance.

That is, the amorphous and/or crystalline carbons are irregularly present in the form of layers at the interfaces between the inorganic fibers and at the interfaces of the inorganic substance and the inorganic fibers. As a reflection of the above structure, the inorganic fiber-bonded ceramics (A) is excellent in fracture resistance and closely packed and maintains remarkably high mechanical properties that its strength at 1,500° C. is at least 80% of its strength at room temperature.

The inorganic fiber-bonded ceramics (A) is produced by
preparing a laminate material (B) of inorganic fibers comprising an internal layer and a surface layer each, as a raw material, the internal layer being composed of an inorganic substance containing (a) and/or (b), (a) an amorphous substance comprising Si, M, C and O (M is Ti or Zr), (b) an assembly of (1) crystalline ultrafine particles of β-SiC, MC and C and (2) amorphous substances of $SiO_2$ and $MO_2$, the surface layer being composed of an inorganic substance containing (c) and/or (d), (c) an amorphous substance comprising Si and O and optionally comprising M, (d) a crystalline substance comprising crystalline $SiO_2$ and/or $MO_2$, the surface layer having a thickness T (unit: μm) satisfying T=aD (in which a is a number in the range of from 0.023 to 0.053 and D is a diameter (unit: μm) of the inorganic fiber), disposing the laminate material (B) around a carbon core having a predetermined shape to produce a preliminary shaped material, or disposing the laminate material (B) on a surface of a component which is obtained by processing a bulk material of the inorganic fiber-bonded ceramics to a size smaller than a predetermined component size, to produce a preliminary shaped material, setting the preliminary shaped material in a carbon die, covering the preliminary shaped material with a carbon powder, and then, loading a pseudo-isotropic pressure on the preliminary shaped material by hot-pressing in an inert gas atmosphere at a temperature in the range of from 1,500 to 2,000° C. under a pressure of 10 to 100 MPa.

The above laminate material (B) is produced by the following steps.

The inorganic fibers used as raw materials in the present invention can be prepared by heating inorganic fibers under an oxidative atmosphere at a temperature in the range of from 500 to 1,600° C. according to, for example, the method disclosed in JP-A-62-289641. The above inorganic fibers (M:Ti) are commercially available as a Tyranno fiber (registered trademark) supplied by Ube industries, Ltd. The form of the inorganic fibers is not specially limited. The inorganic fibers may be in the form of a continuous fiber, a chopped short fiber obtained by cutting the continuous fiber, or a sheet-like material or woven fabric obtained by paralleling the continuous fibers in one direction.

The surface layers of the inorganic fibers are formed by heat-treating the above fibers in an oxidative atmosphere such as air, pure oxygen, ozone, water vapor or a carbonic acid gas. It is necessary to select the heat-treating conditions such that the thickness T (μm) of the surface layer of the inorganic fiber satisfies T=aD (in which a is a number in the range of from 0.023 to 0.053 and D is a diameter (unit: μm) of the inorganic fiber). By strictly controlling the thickness of the surface layer in the above range, it becomes possible to prepare a remarkably closely-packed inorganic fiber-bonded ceramics having a porosity of 2% or less.

According to the above heat-treatment, there are obtained inorganic fibers comprising an internal layer and a surface layer each, as a raw material, the internal layer being composed of an inorganic substance containing (a) and/or (b), (a) an amorphous substance comprising Si, M, C and O (M is Ti or Zr), (b) an assembly of (1) crystalline ultra fine particles of β-SiC, MC and C and (2) amorphous substances of $SiO_2$ and $MO_2$, the surface layer being composed of an inorganic substance containing (c) and/or (d), (c) an amorphous substance comprising Si and O and optionally comprising M, (d) a crystalline substance comprising crystalline $SiO_2$ and/or $MO_2$, the surface layer having a thickness T (unit: μm) satisfying T=aD (in which a is a number in the range of from 0.023 to 0.053 and D is a diameter (unit: μm) of the inorganic fiber)

Then, a laminate material (B) containing at least one form selected from chopped short fibers obtained by cutting continuous fibers of the above-obtained inorganic fibers or a sheet-like material or a woven fabric obtained by paralleling the continuous fibers in one direction, is produced.

FIG. 1 shows a schematic drawing of an example of steps of producing the inorganic fiber-bonded ceramics (A) from the above laminate material (B).

A woven fabric 1 of the above laminate material (B) is wound around a carbon core 2 having a cylindrical shape to form a preliminary shaped material 3. The preliminary shaped material 3 is set in a carbon die 4. Then, the preliminary shaped material 3 is covered with a carbon powder 5. Then, the preliminary shaped material 3 is hot-pressed. A pipe having a cylindrical shape and made of an inorganic fiber-bonded ceramics can be thereby produced.

Further, when the bulk material of the inorganic fiber-bonded ceramics is processed to a size smaller than a predetermined component size, it is preferred to process the bulk material so as to have a size 0.05–5 mm smaller than the predetermined component size. When the thickness is smaller than 0.05 mm, the effect of preventing peeling of the fibers is insufficient. When it is larger than 5 mm, an improvement in the effect of preventing peeling of the fibers on the surface is small as compared with a thickness not larger than 5 mm.

According to the present invention, the above process can produce a component of an inorganic fiber-bonded ceramics (A) composed of (i) inorganic fibers comprising (a) and/or (b), (a) an amorphous substance comprising Si, M, C and O (M is Ti or Zr), (b) an assembly of (1) crystalline fine particles of β-SiC, MC and C and (2) amorphous substances of $SiO_2$ and $MO_2$, (ii) an inorganic substance comprising (c) and/or (d) and optionally comprising (e) dispersed therein, which substance fills interstices between the above inorganic fibers, (c) an amorphous substance comprising Si and O and optionally comprising M, (d) a crystalline substance comprising crystalline $SiO_2$ and $MO_2$, (e) a crystalline fine particle inorganic substance comprising MC having a particle diameter of 100 nm or less, and (iii) boundary layers with thickness of 1 to 100 nm comprising carbon as a main component and optionally comprising crystalline particles of MC having a particle diameter of 100 nm or less dispersed therein, the boundary layers being formed on the surfaces of the inorganic fibers, which component is characterized in that the component has a curved surface and/or an inclined surface and that the fibers are aligned in a surface shape of the curved surface and/or the inclined surface.

Since a conventional inorganic fiber-bonded ceramics is produced by uniaxial-molding of a laminate material with a hot-press, the fibers are aligned in parallel with a surface normal to a pressure direction (to be referred to as "main orientation surface of fibers" hereinafter). Therefore, a component having a curved surface or an inclined surface (a surface inclined at a certain angle with respect to the above main orientation surface of fibers) is required to be produced by machining a bulk material. In this case, interlayers of the inorganic fiber-bonded ceramics are exposed on the surface of the component and thus fiber-reinforced portions and interlayer portions are co-present, which causes the occurrence of cracks (peeling of fibers of a surface portion, delamination).

In contrast, according to the present invention, the inorganic fiber-bonded ceramic component can be produced by loading a pseudo-isotropic pressure on the preliminary shaped material. Therefore, there can be obtained an inorganic fiber-bonded ceramic component in which the fibers are homogeneously aligned in the surface shape of the above-mentioned curved surface or inclined surface without any exposure of interlayers on the surface of the component.

Then, the process for the production of a fiber-bonded ceramic component recited in claim 3 and 4 will be explained.

A fiber material constituting the inorganic fiber-bonded ceramics (C) is inorganic fibers which are composed mainly of a sintered structure of SiC, contain 0.01 to 1% by weight of oxygen and at least one kind of metal atoms selected from the class consisting of metal atoms of the 2A, 3A and 3B groups of the periodic table and are bonded extremely nearly in the closest packing state.

The inorganic fibers composed of a sintered structure of SiC are composed mainly of a polycrystalline sintered structure of β-SiC or the fibers further comprises crystalline fine particles of β-SiC and carbon. In a region where β-SiC crystalline particles containing a microcrystalline of C and/or an extremely small amount of O are sintered to each other, strong bonds between SiC crystals can be obtained. When a fracture occurs in an inorganic fiber, a transcrystalline fracture behavior was observed in at least 30% of the area of the inorganic fiber. In some cases, an intercrystalline fracture and the transcrystalline fracture region are co-present.

The above fiber material contains at least one kind of metal atoms selected from the class consisting of metal atoms of the 2A, 3A and 3B groups of the periodic table. The amount ratio of elements constituting the fiber material is generally as follows. The amount of Si is 55 to 70% by weight, the amount of C is 30 to 45% by weight, the amount of O is 0.01 to 1% by weight and the amount of M (metal element(s) of the 2A, 3A and 3B groups) is 0.05 to 4.0% by weight, preferably 0.1 to 2.0% by weight. Of the metal elements of the 2A, 3A and 3B groups, Be, Mg, Y, Ce, B and Al are particularly preferred. These metal elements are all known as sintering aids for SiC, and they are present in the form of chelate compounds or alkoxide compounds capable of reacting with Si—H bonds of an organosilicon polymer. When the amount of the above metal is extremely small, it is difficult to attain the sufficient crystallizing properties of the fiber material. When it is extremely large, the intercrystalline fractures take place in many places, which results in a decrease in mechanical properties.

Amorphous and crystalline carbons form boundary layers having a range of 1 to 100 nm, preferably a thickness of 10 to 50 nm, at the interfaces between the fibers (fiber material) of the inorganic fiber-bonded ceramics (C). As a reflection of the above structure, the inorganic fiber-bonded ceramics (C) is excellent in fracture resistance and closely-packed and maintains almost its strength at room temperature at 1,600° C.

The above inorganic fiber-bonded ceramics (C) is obtained as follows.

Infusible fibers are obtained by (a) a first step of adding a compound containing at least one kind of metal atoms selected from the class consisting of the 2A, 3A and 3B groups of the periodic table to a polysilane in which the molar ratio of carbon atoms to silicon atoms is at least 1.5 or a heat reaction product thereof and allowing the resultant mixture to react under heat in an inert gas atmosphere, to prepare a metal-element-containing organosilicon polymer, (b) a second step of melt-spinning the metal-element-containing organosilicon polymer to obtain spun fibers, and (c) a third step of heating the spun fibers at 50 to 170° C. in an oxygen-containing atmosphere to prepare the infusible fibers. Otherwise, Inorganic fibers are obtained by (d) a forth step of converting the above infusible fiber to inorganic fibers in an inert gas. A laminate material (D) of the infusible fibers or the inorganic fibers is prepared. A preliminary shaped material is prepared by disposing the laminate material (D) around a carbon core having a predetermined shape or by disposing the laminate material (D) on a surface of a component which is obtained by processing a bulk material of the inorganic fiber-bonded ceramics to a size smaller than a predetermined component size. The preliminary shaped material is set in a carbon die. The preliminary shaped material is covered with a carbon powder and then a pseudo-isotropic pressure is loaded on the preliminary shaped material by hot-pressing in vacuum or in an atmosphere containing at least one component selected from the group consisting of an inert gas, a reducing gas and hydrocarbon at a temperature in the range of from 1,700 to 2,200° C. under a pressure of 10 to 100 MPa. The inorganic fiber-bonded ceramics (C) is thereby obtained.

The laminate material (D) is produced by the following steps.

The steps comprise a first step of adding a compound containing at least one kind of metal atoms selected from the class consisting of the 2A, 3A and 3B groups of the periodic table to a polysilane in which the molar ratio of carbon atoms to silicon atoms is at least 1.5 or a heat reaction product thereof and allowing the resultant mixture to react under heat in an inert gas atmosphere, to prepare a metal-element-containing organosilicon polymer, a second step of melt-spinning the metal-element-containing organosilicon polymer to obtain spun fibers, a third step of heating spun fibers at 50 to 170° C. in an oxygen-containing atmosphere to prepare the infusible fibers, and a forth step of converting the above infusible fibers to inorganic fibers in an inert gas.

First step

In the first step, there is prepared a metal-containing organosilicon polymer which is a precursor polymer.

The polysilane is a chain or cyclic polymer obtained by dechlorination of at least one dichlorosilane with sodium according, for example, to the method described in "Chemistry of Organosilicon Compound" Kagaku Dojin (1972). The polysilane generally has a number average molecular weight of 300 to 1,000. The polysilane used in the present invention may have a hydrogen atom, a lower alkyl group, a phenyl group or a silyl group as a side chain bonding to silicon. In any case, the molar ratio of carbon atoms to silicon atoms is required to be at least 1.5. When this requirement is not satisfied, all the carbon atoms of the fiber are eliminated as a carbonic acid gas together with oxygen atoms introduced for the infusibilization in the process of increasing a temperature before sintering is completed, and undesirably, no boundary carbon layer is formed between the fibers.

The polysilane used in the present invention includes an organosilicon polymer which partly contains carbosilane bonds in addition to polysilane bond units, obtained by heating the above chain or cyclic polysilane. The above organosilicon polymer can be prepared by a known method. The preparation method includes a method of allowing the chain or cyclic polysilane to react under heat at a relatively high temperature of 400 to 700° C. and a method of adding a phenyl-group-containing polyborosiloxane to the above polysilane and allowing the mixture to react under heat at a relatively low temperature of 250 to 500° C. The thus-obtained organosilicon polymer generally has a number average molecular weight of 1,000 to 5,000.

The phenyl-group-containing polyborosiloxane can be prepared according to the method described in JP-A-53-42300 and JP-A-53-50299. For example, the phenyl-group-containing polyborosiloxane can be prepared by dechlorinating condensation of boric acid and at least one diorganochlorosilane, and it generally has a number average molecular weight of 500 to 10,000. The amount of the phenyl-group-containing polyborosilane to be added per 100 parts by weight of the polysilane is generally 15 parts by weight or less.

A predetermined amount of a compound containing a metal element selected from the class consisting of the 2A, 3A and 3B groups of the periodic table is added to the polysilane, and the mixture is allowed to react in an inert gas generally at a temperature in the range of from 250° C. to 350° C. for 1 to 10 hours, whereby the metal-element-containing organosilicon compound as a raw material can be prepared. The above metal element is used in such a proportion that the content thereof in a sintered SiC fiber-bonded material to be finally obtained is 0.05 to 4.0% by weight. The specific proportion can be determined by one skilled in the art according to the teaching of the present specification.

The above metal-element-containing organosilicon compound is a crosslinked polymer having a structure in which at least some silicon atoms of the polysilane bond to metal atoms through an oxygen atom each or through no oxygen atom.

The compound containing a metal element selected from the class consisting of the 2A, 3A and 3B groups, added in the first step, can be selected from alkoxides, acetylalkoxide compounds, carbonyl compounds and cyclopentadienyl compounds of the above metal elements, such as beryllium acetylacetonate, magnesium acetylacetonate, yttrium acetylacetonate, cerium acetylacetonate, boric acid butoxide, aluminum acetylacetonate.

The above compounds are all capable of reacting with Si—H bonds of an organosilicon polymer formed during their reaction with the polysilane or its heat reaction product, to form a structure in which metal elements thereof bond to Si atoms directly or through other element.

Second step

In the second step, spun fibers of a metal-element-containing organosilicon polymer are obtained.

The metal-element-containing organosilicon polymer as a precursor polymer is spun by a known method such as a melt-spinning method or a dry spinning method, to obtain spun fibers.

Third step

In the third step, the spun fibers are heated at 50 to 170° C. in an oxygen-containing atmosphere, to prepare infusible fibers.

The curing is carried out for the purpose of forming crosslinking points of oxygen atoms between polymers constituting the spun fiber so that the infusible fibers are not melted and that adjacent fibers are not fused to each other in the step of conversion of the infusible fibers to inorganic fibers, which step is carried out later.

The gas for constituting the oxygen-containing atmosphere is selected from air, oxygen or ozone. The temperature for the curing is 50 to 170° C., and although depending upon the curing temperature, the time period for the curing is generally from several minutes to 30 hours.

The content of oxygen in the infusible fibers is preferably controlled to be 8 to 16% by weight. Most part of the oxygen remains in the fibers after the step of conversion to inorganic fibers, which step is carried out later, and it has an essential function, i.e., works to eliminate excess carbon in the inorganic fibers as CO gas in a temperature-increasing process before a final sintering is completed.

When the above oxygen content is less than 8% by weight, excess carbon in the inorganic fibers remains more than necessary, segregates around an SiC crystal in the temperature-increasing process to stabilize itself and therefore hampers the sintering of SiC. When the above oxygen content is greater than 16% by weight, excess carbon in the inorganic fibers is completely eliminated, and no boundary carbon layer is formed between the fibers. Both of these results cause detrimental effects on mechanical properties of the obtained material.

The above infusible fibers are preferably subjected further to preliminary heating in an inert atmosphere. The gas for constituting the inert atmosphere is selected from nitrogen, argon or the like. The heating temperature is generally 150 to 800° C., and the time period for the heating is several minutes to 20 hours. The preliminary heating of the infusible fibers in an inert atmosphere serves to proceed with the crosslinking reaction of the polymer constituting the fibers with preventing the inclusion of oxygen in the fibers and serves to more improve the fibers in strength with retaining the excellent extensibility of the infusible fibers from the precursor polymer. Owing to the preliminary heating, the conversion to inorganic fibers, which step is carried out later, is stably carried out with high work efficiency.

Fourth step

In the fourth step, the infusible fibers are converted to inorganic fibers by treating the infusible fibers under heat at a temperature of from 1,000° C. to 1,700° C. in an atmosphere containing an inert gas such as argon by a continuous method or a batch method.

Then, there is prepared a laminate material (D) containing at least one kind of form selected from a woven fabric of the infusible fibers or inorganic fibers prepared by the above steps, a sheet in which the fibers are aligned in one direction, a bundle of the fibers, and chopped short fibers obtained by cutting a continues fiber.

The above laminate material (D) is disposed around a carbon core having a predetermined shape or the laminate material (D) is disposed on a surface of a component which is obtained by processing a bulk material of the inorganic fiber-bonded ceramics to a size smaller than a predetermined component size, to obtain a preliminary shaped material. The preliminary shaped material is set in a carbon die, and then it is covered with a carbon powder. Then, a pseudo-isotropic pressure is loaded on the preliminary shaped material by hot-pressing in vacuum or in an atmosphere containing at least one component selected from the group consisting of an inert gas, a reducing gas and hydrocarbon at a temperature in the range of from 1,700 to 2,200° C. under a pressure of 10 to 100 MPa. The inorganic fiber-bonded ceramic component can be thereby obtained.

Further, a pressurization program fitting the speed of the above elimination of CO may be inserted in the temperature-increasing process before the pressurization.

Further, when the bulk material of the inorganic fiber-bonded ceramics is processed to a size smaller than a predetermined component size, it is preferred to process the bulk material so as to have a size 0.05–5 mm smaller than the predetermined component size. When the thickness is smaller than 0.05 mm, the effect of preventing peeling of the fibers is insufficient. When it is larger than 5 mm, an improvement in the effect of preventing peeling of the fibers on the surface is small as compared with a thickness not larger than 5 mm.

According to the present invention, the above process can produce a component of an inorganic fiber-bonded ceramics (C) comprising inorganic fibers which are composed mainly of a sintered structure of SiC, contain 0.01 to 1% by weight of oxygen and at least one kind of metal atoms selected from the class consisting of metal atoms of the 2A, 3A and 3B groups of the periodic table and are bonded extremely nearly in the closest packing state and boundary layers with thickness of 1 to 100 nm composed mainly of carbon which are present between the fibers, which component is characterized in that the component has a curved surface and/or an inclined surface and that the fibers are aligned in a surface shape of the curved surface and/or the inclined surface.

According to the present invention, the inorganic fiber-bonded ceramic component can be produced by loading a pseudo-isotropic pressure on the preliminary shaped material. Therefore, there can be obtained an inorganic fiber-bonded ceramic component in which the fibers are homogeneously aligned in a surface shape of the above-mentioned curved surface or inclined surface without any exposure of interlayers on the surface of the component.

EXAMPLES

The present invention will be explained more in detail with reference to Examples hereinafter.

Example 1

Figure 2:
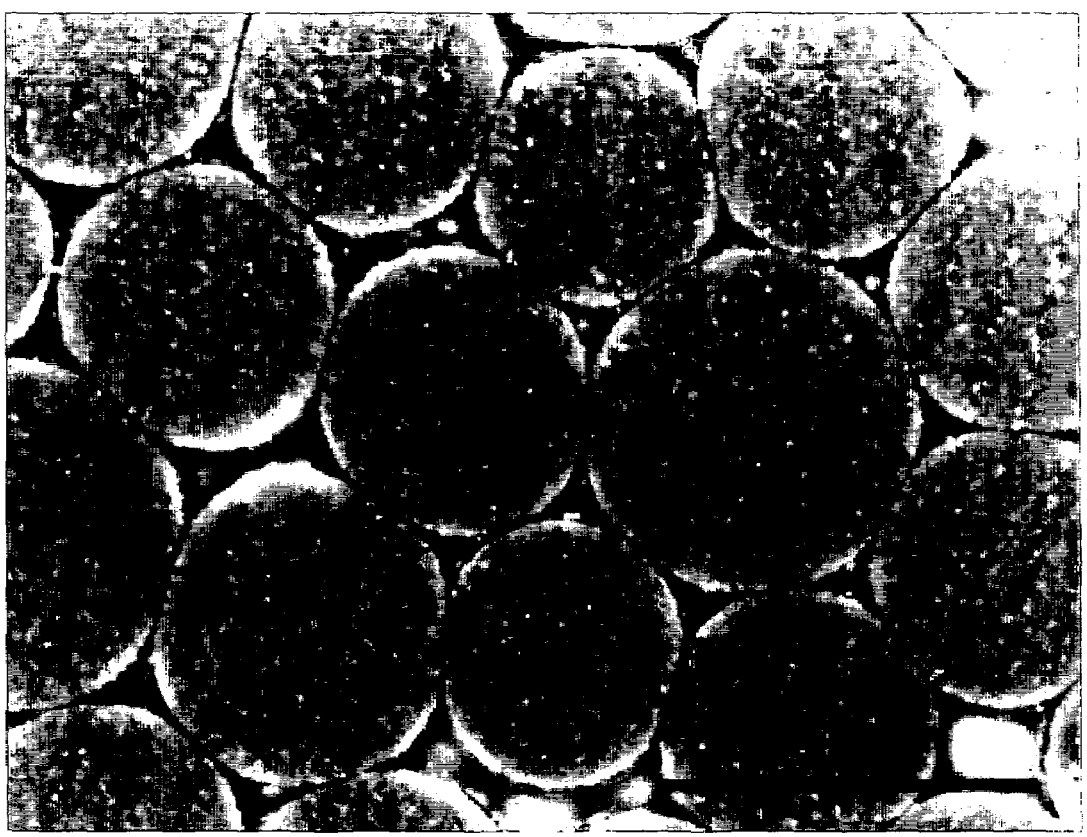
FIG. 2 is a scanning electron micrograph showing the cross-sectional structure of an inorganic fiber-bonded ceramics obtained in Example 1 of the present invention.

Tyranno fibers (trade name: supplied by Ube Industries Ltd.) having a fiber diameter of 10 μm were heat-treated at 950° C. in the air for 15 hours to prepare inorganic fibers composed of a surface layer and an internal layer. The fibers each had a homogenous surface layer with thickness of about 300 nm, which corresponded to a=0.030, formed on the surface thereof. Then, a satin woven fabric of the above inorganic fibers was disposed around a carbon core having an outer diameter of 30 mm and a length of 100 mm to obtain a preliminary shaped material. The preliminary shaped material was set in a carbon die. Then, a carbon powder was added from the upper part so as to cover the preliminary shaped material, and an upper punch was set. Then, the preliminary shaped material was hot-pressed in an argon atmosphere at 1,800° C. and at a pressure of 50 MPa. By the hot-pressing, the pressure was transmitted to the carbon powder and a pseudo-isotropic pressure was thus loaded on the preliminary shaped material, whereby a pipe-shaped component made of an inorganic fiber-bonded ceramics was obtained. The obtained inorganic fiber-bonded ceramic component was remarkably closely-packed and it had a constitution similar to that of an inorganic fiber-bonded ceramic component produced by machining a bulk material. FIG. 2 is a micrograph showing the cross-sectional structure of the component.

Example 2

While anhydrous xylene containing 400 g of sodium was refluxed under heat under the current of nitrogen gas, 1 liter of dimethyldichlorosilane was dropwise added to the xylene, and then, the mixture was refluxed under heat for 10 hours to form a precipitate. The precipitate was recovered by filtration and washed with methanol and then with water to give 420 g of a white polydimethylsilane.

Then, 750 g of diphenyldichlorosilane and 124 g of boric acid were heated at 100 to 120° C. in n-butyl ether in a nitrogen gas atmosphere, and a formed while resinous material was further heat-treated at 400° C. in vacuum for 1 hour to give 530 g of a phenyl-group-containing polyborosiloxane.

Figure 3:
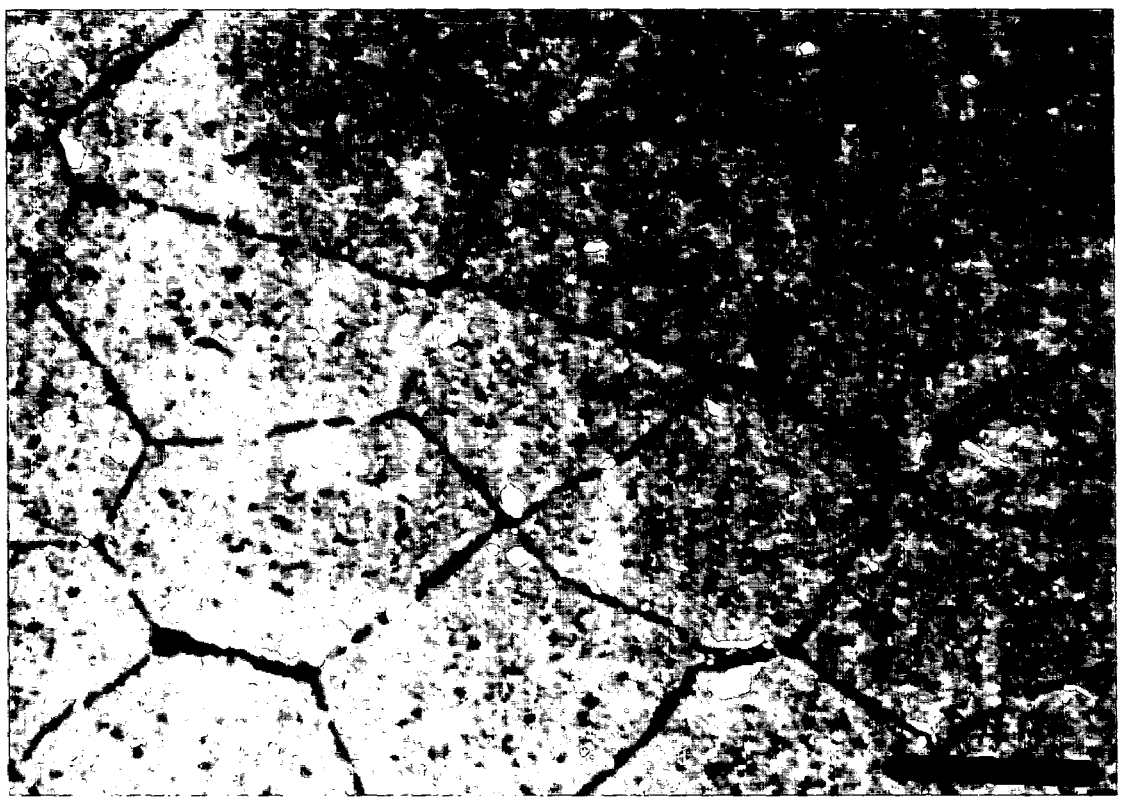
FIG. 3 is a scanning electron micrograph showing the cross-sectional structure of an inorganic fiber-bonded ceramics obtained in Example 2 of the present invention.

4 parts of this phenyl-group-containing polyborosiloxane was added to 100 parts of the above-obtained polydimethylsilane, and the mixture was allowed to undergo thermal condensation at 350° C. for 5 hours in a nitrogen gas atmosphere to obtain an organosilicon polymer having a high molecular weight. 7 parts of aluminum-tri-(sec-butoxide) was added to a solution of 100 parts of the above organosilicon polymer in xylene, and the mixture was allowed to undergo a crosslinking reaction at 310° C. under the current of nitrogen gas, to synthesize a polyaluminocarbosilane. The polyaluminocarbosilane was melt-spun at 245° C., and the spun fibers were heat-treated in air at 140° C. for 5 hours and, further, heated in nitrogen at 300° C. for 10 hours to obtain infusible fibers. The above infusible fibers were continuously burnt in nitrogen at 1,500° C. to synthesize silicon-carbide-containing continuous inorganic fibers. Then, a satin woven fabric of the above inorganic fibers was disposed around a carbon core having an outer diameter of 50 mm and a length of 40 mm to obtain a preliminary shaped material. The preliminary shaped material was set in a carbon die. Then, a carbon powder was added from the upper part so as to cover the preliminary shaped material, and an upper punch was set. Then, the preliminary shaped material was hot-pressed in an argon atmosphere at 1,850° C. and at a pressure of 50 MPa. By the hot-pressing, the pressure was transmitted to the carbon powder and a pseudo-isotropic pressure was thus loaded on the preliminary shaped material, whereby a pipe-shaped component made of an inorganic fiber-bonded ceramics was obtained. The obtained inorganic fiber-bonded ceramic component was remarkably closely-packed and it had a constitution similar to that of an inorganic fiber-bonded ceramic component produced by machining a bulk material. FIG. 3 is a micrograph showing the cross-sectional structure of the component.

Example 3

Inorganic fibers each composed of a surface layer and an internal layer were prepared in the same manner as in Example 1. The fibers were shaped into a woven fabric and a laminate material was obtained from the woven fabric. The laminate material was set in a carbon die and then molded at a pressure of 50 MPa and at a temperature of 1,800° C., to obtain an inorganic fiber-bonded ceramics. Then, the laminate material was again disposed on a surface of the inorganic fiber-bonded ceramics which surface had a size 2-mm smaller than a component size, to obtain a preliminary shaped material. The preliminary shaped material was set in a carbon die. Then, a carbon powder was added from the upper part so as to cover the preliminary shaped material, and an upper punch was set. Then, the preliminary shaped material was hot-pressed in an argon atmosphere at 1,800° C. and at a pressure of 50 MPa. By the hot-pressing, the pressure was transmitted to the preliminary shaped material through the carbon powder and a pseudo-isotropic pressure was thus loaded on the preliminary shaped material, whereby there was obtained an inorganic fiber-bonded ceramics in which the fibers were aligned on the surface. The surface of the obtained inorganic fiber-bonded ceramic component was remarkably closely-packed and no interlayer portions were exposed.

Example 4

Figure 4:
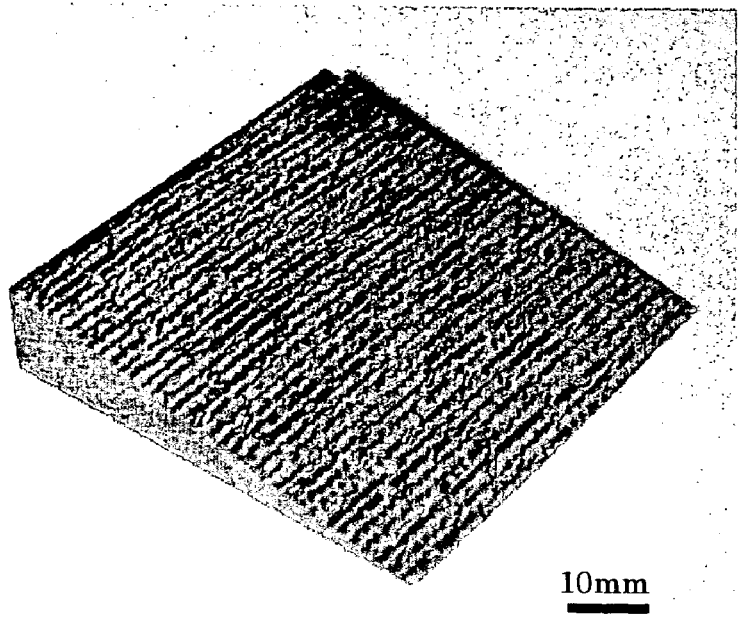
FIG. 4 is a photograph showing the state of a surface of an inorganic fiber-bonded ceramics which surface is processed to have a size 2-mm smaller than the size of a component in Example 4 of the present invention.
Figure 5:
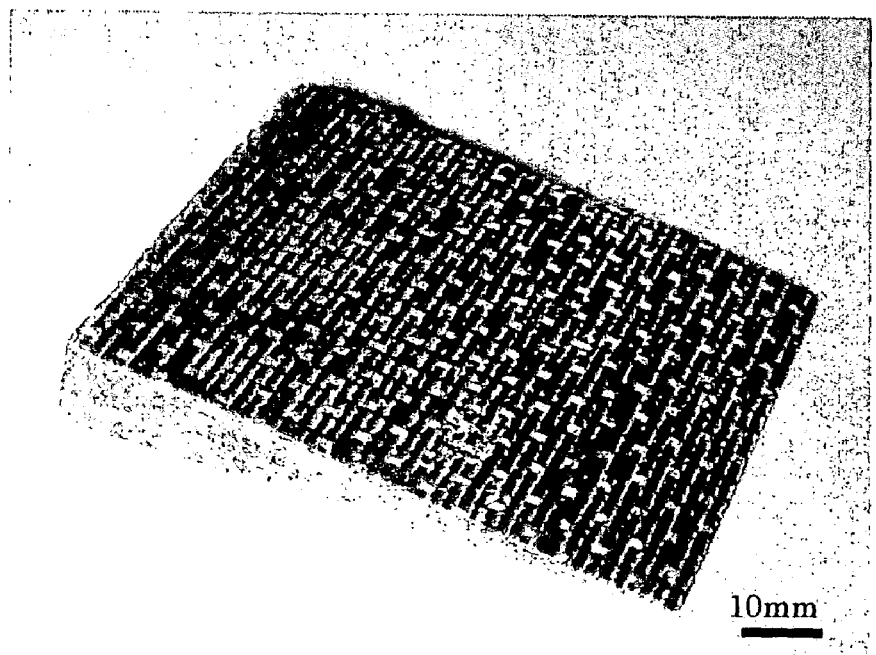
FIG. 5 is a photograph showing the state of the surface of an inorganic fiber-bonded ceramics in which fibers are aligned on the surface thereof in Example 4 of the present invention.

Silicon-carbide-containing continuous inorganic fibers were obtained similarly to Example 2. The fibers were shaped into a woven fabric and a laminate material was obtained from the woven fabric. The laminate material was set in a carbon die and then molded at a pressure of 50 MPa and at a temperature of 1,850° C., to obtain an inorganic fiber-bonded ceramics. Then, the inorganic fiber-bonded ceramics was processed such that a surface on which the laminate material was to be disposed had a size 2-mm smaller than a component size. FIG. 4 shows the state of the surface thereof. Interlayer portions are exposed in many places on the surface. Then, the laminate material was again disposed on the above surface of the inorganic fiber-bonded ceramics which surface had a size 2-mm smaller than a component size, to obtain a preliminary shaped material. The preliminary shaped material was set in a carbon die. Then, a carbon powder was added from the upper part so as to cover the preliminary shaped material, and an upper punch was set. Then, the preliminary shaped material was hot-pressed in an argon atmosphere at 1,850° C. and at a pressure of 50 MPa. By the hot-pressing, the pressure was transmitted to the preliminary shaped material through the carbon powder and a pseudo-isotropic pressure was thus loaded on the preliminary shaped material, whereby there was obtained an inorganic fiber-bonded ceramics in which the fibers were aligned on the surface, as shown in FIG. 5. The surface of the obtained inorganic fiber-bonded ceramic component was remarkably closely-packed and no interlayer portions were exposed.

EFFECT OF THE INVENTION

According to the present invention, it becomes possible to primary-mold a highly heat-resistant inorganic fiber-bonded ceramics having excellent heat resistance and smoothness and high fracture resistance in a shape similar to a component shape. It is possible to decrease cutting allowance due to processing and decrease a production cost.

Further, there is obtained a highly heat-resistant inorganic fiber-bonded ceramic component in which the fibers are regularly aligned on the surface thereof and properties of the surface are homogenous, which component is almost free from the occurrence of peelings of surface fibers or delamination.

Accordingly, the highly heat-resistant inorganic fiber-bonded ceramic component of the present invention can be applied to a high-temperature component having high surface smoothness and density and required to have high fracture resistance, such as a high-temperature component for a gas turbine for power generation or for an airplane.

What is claimed is:

1. A component of an inorganic fiber-bonded ceramics (A) composed of
   (i) inorganic fibers comprising (a) and/or (b),
   (a) an amorphous substance comprising Si, M, C and O (M is Ti or Zr),
   (b) an assembly of (1) crystalline fine particles of β-SiC, MC and C and (2) amorphous substances of $SiO_2$ and $MO_2$,
   (ii) an inorganic substance comprising (c) and/or (d) and optionally comprising (e) dispersed therein, which substance fills interstices between the above inorganic fibers,
   (c) an amorphous substance comprising Si and O and optionally comprising M,
   (d) a crystalline substance comprising crystalline $SiO_2$ and $MO_2$,
   (e) a crystalline fine particle inorganic substance comprising MC having a particle diameter of 100 nm or less, and
   (iii) boundary layers with thickness of 1 to 100 nm comprising carbon as a main component and optionally comprising crystalline particles of MC having a particle diameter of 100 nm or less dispersed therein, the boundary layers being formed on the surfaces of the inorganic fibers,
   wherein the component of the inorganic fiber-bonded ceramics (A) is obtained by
   preparing a laminate material (B) of inorganic fibers comprising an internal layer and a surface layer each, as a raw material,
   the internal layer being composed of an inorganic substance containing (a) and/or (b),
   (a) an amorphous substance comprising Si, M, C and O (M is Ti or Zr),
   (b) an assembly of (1) crystalline ultrafine particles of β-SiC, MC and C and (2) amorphous substances of $SiO_2$ and $MO_2$,
   the surface layer being composed of an inorganic substance containing (c) and/or (d),
   (c) an amorphous substance comprising Si and O and optionally comprising M,
   (d) a crystalline substance comprising crystalline $SiO_2$ and/or $MO_2$,
   the surface layer having a thickness T (unit: μm) satisfying T=aD (in which a is a number in the range of from 0.023 to 0.053 and D is a diameter (unit: μm) of the inorganic fiber), and
   disposing the laminate material (B) around a carbon core having a predetermined shape to produce a preliminary shaped material, or
   disposing the laminate material (B) on a surface of a component which is obtained by processing a bulk material of the inorganic fiber-bonded ceramics to a size smaller than a predetermined component size, to produce a preliminary shaped material,
   setting the preliminary shaped material in a carbon die,
   covering the preliminary shaped material with a carbon powder, and then,
   loading a pseudo-isotropic pressure on the preliminary shaped material by hot-pressing in an inert gas atmosphere at a temperature in the range of from 1,500 to 2,000° C. under a pressure of 10 to 100 MPa, and wherein the component has a curved surface and/or an inclined surface and the fibers are aligned in a surface shape of the curved surface and/or the inclined surface.

2. A component of an inorganic fiber-bonded ceramics (C) comprising inorganic fibers which are composed mainly of a sintered structure of SiC, contain 0.01 to 1% by weight of oxygen and at least one kind of metal atoms selected from the class consisting of metal atoms of the 2A, 3A and 3B groups of the periodic table and are bonded extremely nearly in the closest packing state and boundary layers with thickness of 1 to 100 nm composed mainly of carbon which are present between the fibers, wherein the component of the inorganic fiber-bonded ceramics (C) is obtained by preparing a laminate material (D) of infusible fibers or inorganic fibers, the infusible fibers being obtained by (a) a first step of adding a compound containing at least one kind of metal atoms selected from the class consisting of the 2A, 3A and 3B groups of the periodic table to a polysilane in which the molar ratio of carbon atoms to silicon atoms is at least 1.5 or a heat reaction product thereof and allowing the resultant mixture to react under heat in an inert gas atmosphere, to prepare a metal-element-containing organosilicon polymer, (b) a second step of melt-spinning the metal-element-containing organo silicon polymer to obtain spun fibers, and (c) a third step of heating the spun fibers at 50 to 170° C. in an oxygen-containing atmosphere to prepare the infusible fibers, the inorganic fibers being obtained by (d) a fourth step of converting the above infusible fibers to inorganic fibers in an inert gas, disposing the laminate material (D) around a carbon core having a predetermined shape, to prepare a preliminary shaped material, or disposing the laminate material (D) on a surface of a component which is obtained by processing a bulk material of the inorganic fiber-bonded ceramics to a size smaller than a predetermined component size, to produce a preliminary shaped material, setting the preliminary shaped material in a carbon die, covering the preliminary shaped material with a carbon powder, and then, loading a pseudo-isotropic pressure on the preliminary shaped material by hot-pressing in vacuum or in an atmosphere containing at least one component selected from the group consisting of an inert gas, a reducing gas and hydrocarbon at a temperature in the range of from 1,700 to 2,200° C. under a pressure of 10 to 100 MPa, and wherein the component has a curved surface and/or an inclined surface and the fibers are aligned in a surface shape of the curved surface and/or the inclined surface.

* * * * *